United States Patent
Lewke

(10) Patent No.: US 9,157,419 B2
(45) Date of Patent: Oct. 13, 2015

(54) LIGHTNING PROTECTION SYSTEM FOR A WIND TURBINE AND WIND TURBINE WITH A LIGHTNING PROTECTION SYSTEM

(75) Inventor: Bastian Lewke, Herning (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 745 days.

(21) Appl. No.: 13/514,628

(22) PCT Filed: Mar. 3, 2010

(86) PCT No.: PCT/EP2010/052681
§ 371 (c)(1),
(2), (4) Date: Jul. 11, 2012

(87) PCT Pub. No.: WO2011/069686
PCT Pub. Date: Jun. 16, 2011

(65) Prior Publication Data
US 2012/0269631 A1 Oct. 25, 2012

(30) Foreign Application Priority Data
Dec. 9, 2009 (EP) .................................... 09015262

(51) Int. Cl.
*F03D 11/00* (2006.01)
(52) U.S. Cl.
CPC ........... *F03D 11/0033* (2013.01); *Y02E 10/722* (2013.01)
(58) Field of Classification Search
CPC ..... F03D 11/0033; F03D 11/00; F03D 11/04; Y02E 10/722
See application file for complete search history.

(56) References Cited

U.S. PATENT DOCUMENTS

| | | | | |
|---|---|---|---|---|
| 5,773,906 A | * | 6/1998 | Mukai et al. | 310/232 |
| 6,407,900 B1 | * | 6/2002 | Shirakawa et al. | 361/117 |
| 6,457,943 B1 | * | 10/2002 | Olsen et al. | 416/230 |
| 7,377,750 B1 | * | 5/2008 | Costin et al. | 416/146 R |
| 2004/0232704 A1 | * | 11/2004 | Casazza et al. | 290/55 |
| 2006/0013695 A1 | * | 1/2006 | Pedersen | 416/248 |
| 2007/0009361 A1 | * | 1/2007 | Moller Larsen et al. | 416/146 R |
| 2009/0038819 A1 | * | 2/2009 | Molbech | 174/2 |
| 2009/0053062 A1 | * | 2/2009 | Arinaga et al. | 416/146 R |

FOREIGN PATENT DOCUMENTS

| CN | 101463802 A | 6/2009 |
|---|---|---|
| DE | 102007052525 A1 | 5/2009 |

(Continued)

*Primary Examiner* — Edward Look
*Assistant Examiner* — Aaron R Eastman

(57) ABSTRACT

A lightning protection system is provided for a wind turbine. The wind turbine has an electrically grounded structure part, a main shaft electrically and mechanically connected to the grounded structure part, a blade hub rotationally connected via a main bearing to the main shaft and blades connected to the blade hub. The lightning protection system includes a down-conductor attachable inside one of the blades and a high voltage conductor for guiding lightning current, wherein a first end of the high voltage conductor is in electrical communication with the down-conductor. The lightning protection system also includes a high voltage contact attachable inside the main shaft, wherein a second end of the high voltage conductor is in electrical communication with the high voltage contact. Lightning current is guided from the down-conductor via the high voltage conductor to the high voltage contact.

13 Claims, 2 Drawing Sheets

(56) References Cited

FOREIGN PATENT DOCUMENTS

| EP | 1568883 | A2 | 8/2005 |
| EP | 1577551 | A2 | 9/2005 |
| EP | 1930586 | A1 | 6/2008 |
| WO | WO 0186144 | A1 | 11/2001 |
| WO | WO 2005050008 | A1 | 6/2005 |

* cited by examiner

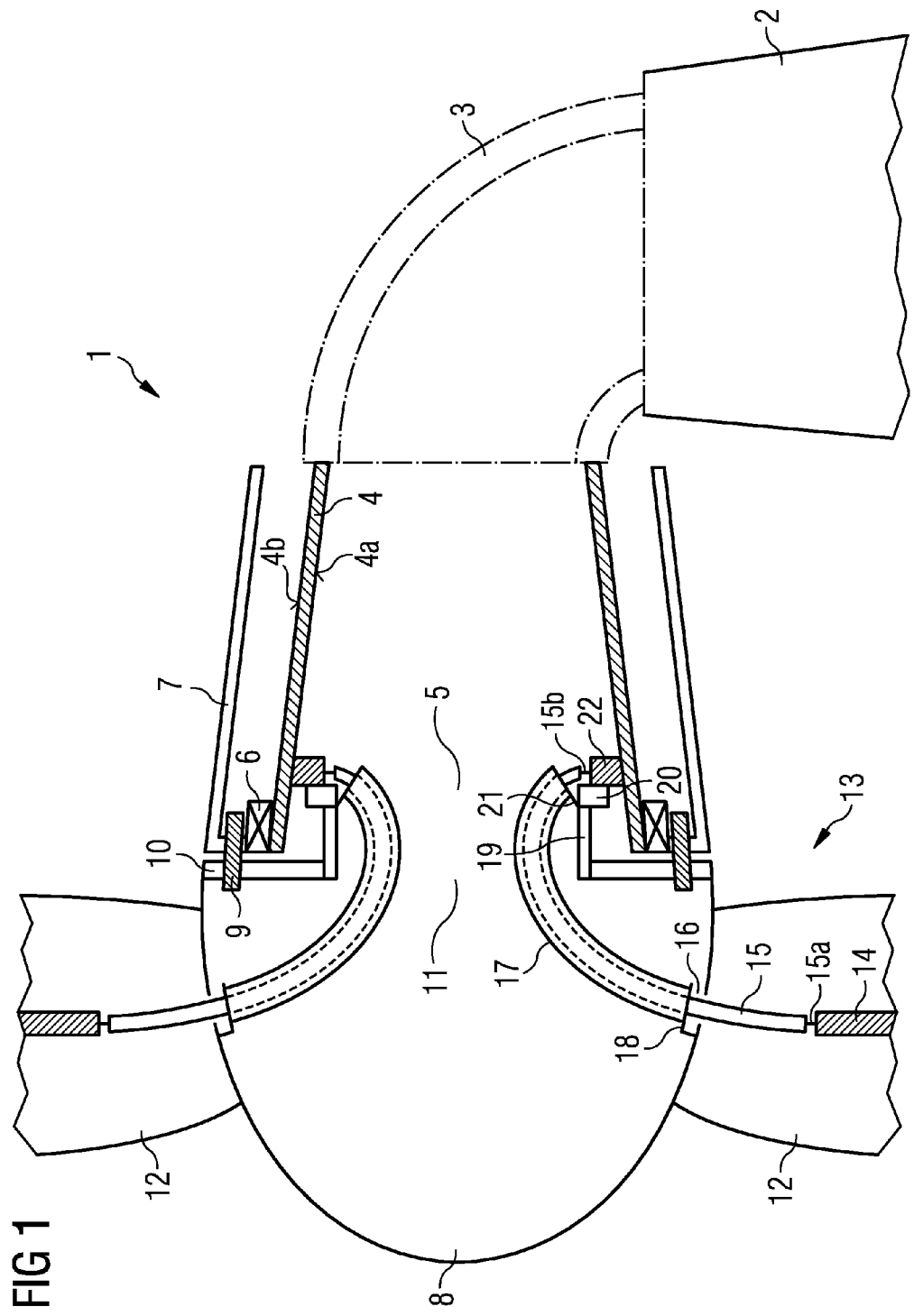

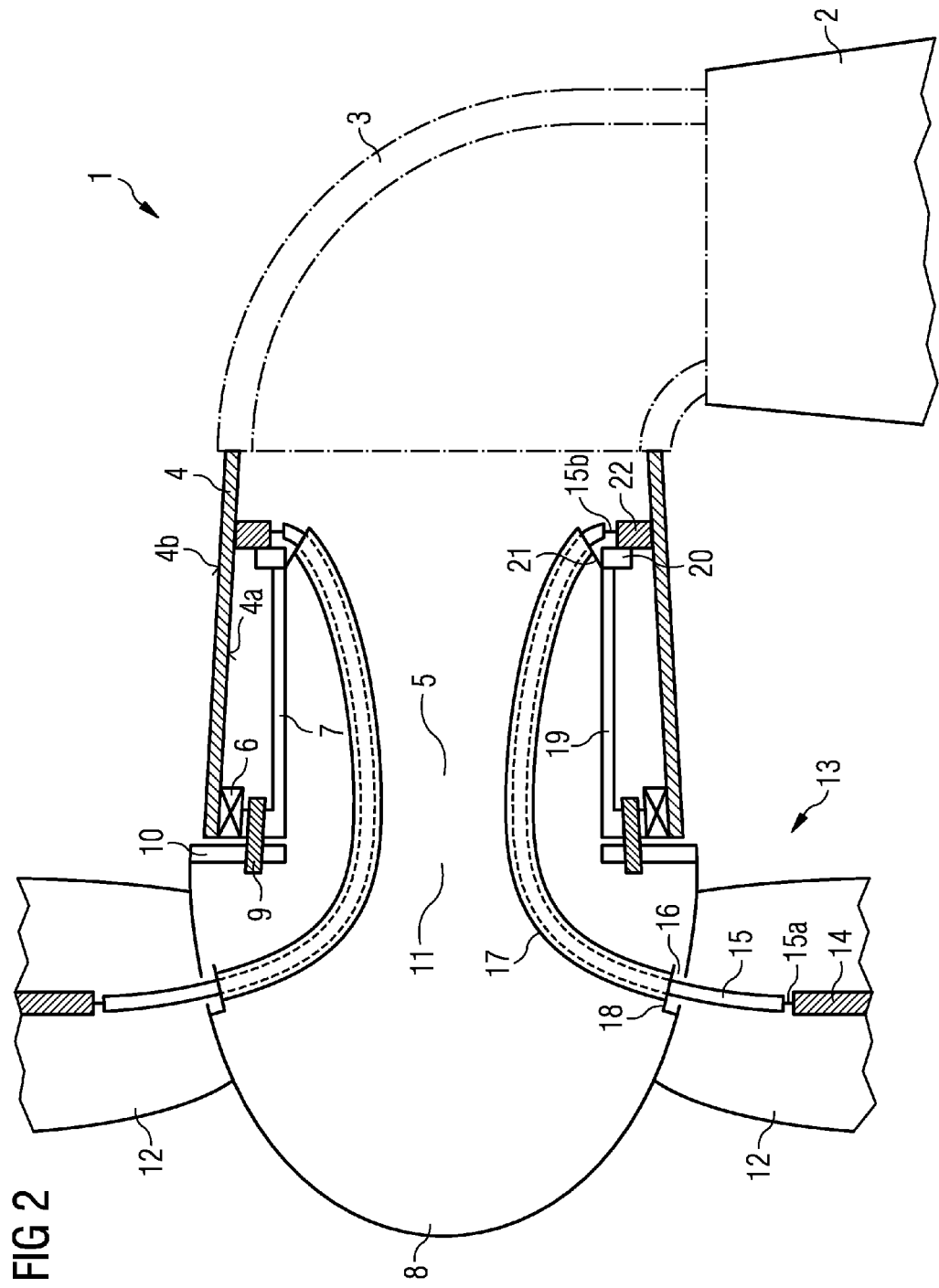

LIGHTNING PROTECTION SYSTEM FOR A WIND TURBINE AND WIND TURBINE WITH A LIGHTNING PROTECTION SYSTEM

CROSS REFERENCE TO RELATED APPLICATIONS

This application is the US National Stage of International Application No. PCT/EP2010/052681, filed Mar. 3, 2010 and claims the benefit thereof. The International Application claims the benefits of European application No. 09015262.0 EP filed Dec. 9, 2009. All of the applications are incorporated by reference herein in their entirety.

FIELD OF INVENTION

The present invention relates in general to wind turbines. In particular, the present invention is directed to a lightning protection system for a wind turbine and a wind turbine with a lightning protection system.

BACKGROUND OF INVENTION

Lightning strikes are a major reason for wind turbine failures. When a lightning strikes a wind turbine often one or more blades of the wind turbine are hit. From there the current of the lightning strike is usually conducted by conducting means like a down-conductor to one or more wind turbine components like the hub, nacelle or the tower and then further down to the ground.

The current flowing through the wind turbine must not reach any electrical components like the generator or converter or other critical components like the main bearings or the gearbox as they would be damaged by the large energy of the lightning strike. The combination of a high voltage and a large electrical current from the lightning strike could damage these components.

Often, the down-conductor is connected directly to the hub which conducts the current to the nacelle and further down to the ground. For a direct drive wind turbine also called gearless wind turbine the hub is connected electrically and mechanically to the rotor of the generator. Due to this design the current can pass onto the rotor and discharge into the stator of the generator. The large current of up to 200 kA could destroy the permanent magnets, the generator windings and could introduce metallic particles between rotor and stator. The particles will stick to the magnets and decrease the distance between rotor and stator which might cause contact between both generator parts. Therefore, lightning protection systems like these are not applicable for direct drive wind turbines.

For a direct drive wind turbine having a generator with an outer rotating rotor it is even more difficult to find a way to conduct the electrical current from a lightning strike to the blades without damaging the generator or other components of the wind turbine.

U.S. Pat. No. 7,377,750 B1 shows a lightning protection system for conducting lightning strikes to the blades and further to the region surrounding a blade hub and along a path around the blade hub and critical components of the wind turbine. The long lightning conducting path has directional shifts or turns bearing the risk of lightning strike jumps to a critical component.

SUMMARY OF INVENTION

Accordingly, a need exists for an improved lightning protection system for a wind turbine that addresses these and other shortcomings of the current art.

This need is satisfied by the features of the independent claims. The dependent claims offer further details and advantages of the invention.

In one aspect the invention is directed to a lightning protection system for a wind turbine. The wind turbine has an electrically grounded structure part, a main shaft electrically and mechanically connected therewith, a blade hub rotatively connected via a main bearing to the main shaft and blades connected to the blade hub. The lightning protection system comprises a down-conductor attachable inside a blade, a high voltage conductor, preferably an electrically isolated high-voltage cable, for guiding lightning current, wherein a first end of the high voltage conductor is in electrical communication with the down conductor. A high voltage contact is attachable inside the main shaft, wherein a second end of the high voltage conductor is in electrical communication with the high voltage contact. A lightning current is guided from the down-conductor via the high voltage conductor to the high voltage contact.

By introducing one or more high voltage conductors, e.g. insulated high voltage cables, between the down-conductor in the blade and the grounded main shaft, the lightning current will be kept off the metallic hub structure and therefore off the generator. The connection between the high voltage conductor and the main shaft is preferably realised The high voltage contact may be attachable inside the main shaft behind the main bearing at a side opposite to the blade hub.

The high voltage conductor could be disposed inside the blade hub.

The high voltage conductor may contact the down-conductor inside the blade.

The high voltage conductor may comprise at least part of the down-conductor.

The high voltage conductor may comprise a high voltage cable.

At least part of the high voltage conductor may be surrounded by a shielding hose.

The high voltage contact may comprise a slip ring attachable to an inner surface of the main shaft, or the high voltage contact may comprise a carbon/metal brush to ensure good electric connection.

The connection between the down-conductor and the high voltage cable as well as between the brushes or slip rings and the high voltage cable are preferably realized by high voltage connections or high voltage bushings to ensure that no surface discharge will occur on the high voltage cable.

Holding brackets for the high voltage conductor could be attached inside the blade hub.

In another aspect the invention is directed to a wind turbine with a lightning protection system. The wind turbine has an electrically grounded structure part, a main shaft electrically and mechanically connected therewith, a blade hub rotatively connected via a main bearing to the main shaft and blades connected to the blade hub. The lightning protection system of the wind turbine has a down-conductor attached inside a blade, a high voltage conductor for guiding lightning current, wherein a first end of the high voltage conductor is in electrical communication with the down conductor. A high voltage contact is attached inside the main shaft, wherein a second end of the high voltage conductor is in electrical communication with the high voltage contact. A lightning current is guided from the down-conductor via the high voltage conductor to the high voltage contact and from there via the main shaft and the structure part towards the ground.

The main shaft may be an inner shaft carrying a stator of a generator and an outer shaft carrying a rotor of the generator may be connected with the blade hub.

The main shaft may be an outer shaft carrying a stator of a generator and an inner shaft carrying a rotor of the generator may be connected with the blade hub.

A generator may be connected directly to the blade hub.

BRIEF DESCRIPTION OF THE DRAWINGS

The accompanying drawings are included to provide a further understanding of embodiments. Other embodiments and many of the intended advantages will be readily appreciated as they become better understood by reference to the following detailed description. The elements of the drawings do not necessarily scale to each other Like reference numbers designate corresponding similar parts.

FIG. 1 illustrates a schematic view of a wind turbine and a lightning protection system according to a first embodiment of the invention.

FIG. 2 illustrates a schematic view of a wind turbine and a lightning protection system according to a second embodiment of the invention.

DETAILED DESCRIPTION OF INVENTION

In the following detailed description, reference is made to the accompanying drawings which form a part hereof and in which are shown by way of illustration specific embodiments in which the invention may be practised. In this regard, directional terminology, such as "top" or "bottom" etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The following exemplary embodiments of the invention describe lightning protection system of a wind turbine comprising a down-conductor of a blade connected to a first end of an electrical isolated HV-cable inside the blade where the second end of the HV-cable is attached to an inner shaft of a generator which is electrical connected to the ground and where the HV-cable from the blade to the inner shaft of the generator is driven through one or more openings of a blade hub. The second end of the HV-cable may be attached to the inner shaft inside one or more openings of the inner shaft. The HV-cable may be attached to the inner shaft of the generator by a holder which is attached to a rotor of the generator by connection means. Furthermore, one embodiment describes a Wind turbine with such a lightning protection system where a rotor of the generator is connected to the blade hub and where the generator comprises an outer rotor and an inner stator where the stator is connected to the inner shaft of the generator by the means of one or more bearings and where the inner shaft is electrical and mechanical connected to a structure part of the wind turbine which is further electrical connected to the ground.

A wind turbine 1 has a structure part called tower 2 which is fixed to the ground and electrically grounded. Usually the tower 2 consists of a long metallic tube. The tower 2 supports the whole wind turbine 1. At the top of the tower 2 a tower connector 3 is attached. The tower connector 3 is usually a bent metallic tube having an angle of bend of approximately ninety degrees.

To the other end of the tower connector 3 a metallic main shaft 4 of the wind turbine 1 is fixed. The main shaft 4 has an approximately horizontal orientation. The main shaft 4 is a hollow tube having an inner surface 4a and an outer surface 4b. At a front side of the main shaft 4 a front opening 5 of the main shaft 4 is located on the side opposite to the tower connector 3.

At the front side of the main shaft 4 a main bearing 6 is arranged on the outer surface 4b. The main bearing 6 may be a ball bearing fitted along the circumference of the main shaft 4. The main bearing 6 connects the main shaft 4 and a rotor 7 rotatively. The rotor 7 carries rotor windings or permanent magnets of the generator which are for the sake of simplicity not shown. The corresponding stator windings (not shown) of the generator are arranged at the outer surface 4b of the main shaft 4.

To the front side of the rotor 7 a blade hub 8 is connected by means of bolts or screws 9. The blade hub 8 has the shape of a dome and is hollow. A base 10 of the blade hub 8 faces the front side of the rotor 7 and carries the bolts 9. The base 10 has a central opening 11 which is in communication with the front opening 5 and the interior of the main shaft 4. Inside the blade hub 8 electrical components e.g. like a pitch control may be located. The blade hub 8 may directly contact the main bearing 6 instead of being in indirect connection via the rotor 7. The rotor 7 may be part of the blade hub 8 or attached to it at a point behind the main bearing 6.

Attached to the outside of the blade hub 8 are blades 12. Usually three blades 12 are distributed along the circumference of the blade hub 8. Blades 12 can be mounted in a fixed manner or rotatively.

A lightning protection system 13 is installed with the wind turbine 1. A down conductor 14 is arranged in each blade 12 to conduct a lightning current from the blade surface. The down conductor 14 can be made of threaded or unthreaded copper or aluminium cable or other materials or combination of materials suitable for conducting current from a lightning strike.

A high voltage conductor like for example an insulated high voltage cable 15 is connected to the down conductor 14. The high voltage conductor 15 is capable of conducting the large energy of a lightning strike without a risk that the current jumps from the conductor to a component of the wind turbine 1. The high voltage cable 15 has one or more outside layers of electrical insulation and one or more inside layers of electrical conducting material including an electrical conducting core.

A first end 15a of the high voltage cable 15 is connected to the down conductor 14. This connection is done inside the blade 12. If electrical components inside the blade 12 need to be protected for example, at least part of the down conductor 14 may comprise a high voltage cable as well. It is also possible to use a short down conductor 14 and a corresponding longer high voltage cable 15. Further, the high voltage cable 15 may replace the down conductor 14. In this case care has to be taken that the current from the lightning strike is caught and guided to the high voltage cable 15.

The high voltage cable 15 progresses into the blade hub 8 inside the blade 12 through an opening 16 in the blade hub 8. The high voltage cable 15 and the down conductor 14 may run outside the blade 12. Then the high voltage cable 15 enters the blade hub 8 through an opening external to the blade 12.

Inside the blade hub 8 the high voltage cable 15 is surrounded by a preferably metallic shielding hose 17. The shielding hose 17 may be implemented directly in the high voltage cable 15. One end of the shielding hose 17 is connected to the blade hub 8 by a hub bracket 18. The shielding hose 17 may also cover the high voltage cable 15 or parts of it inside the blade 12.

A brush holder 19 is mounted at the base 10 of the blade hub 8. The brush holder 19 can consist of a hollow tube arranged approximately parallel to the main shaft 4 or of a few stays arranged along an inner circumference of the base 10. The brush holder 19 projects into the main shaft 4. To the end being inside the main shaft 4 an electric insulation 20 is connected. The electric insulation 20 has the shape of a ring.

A main shaft bracket 21 for the high voltage cable 15 is fixed to the electric insulation 20. The main shaft bracket carries a second end of the shielding hose 17 which surrounds the high voltage cable 15. The shielding hose 17 may be fixed to the brush holder 19.

A slip ring 22 is attached to the inner surface 4a of the main shaft 4 as a high voltage contact for the high voltage cable 15. A second end 15b of the high voltage cable 15 is in sliding communication with the slip ring 22. A carbon/metal brush/spark gap connection or any other kind of electrical sliding connections suitable for lightning protection systems can be implemented. A good electrical connection with low resistance is preferred. The connections between the down-conductor 14 and the high voltage cable 15 and between the slip ring or brushes 22 and the high voltage cable 15 respectively, is preferably implemented as a high voltage connection or high voltage bushing to ensure that no surface discharges will occur on the high voltage cable 15.

The slip ring 22 is preferably located behind the main bearing 6 which means opposite to the blade hub 8. The brush holder 19 has a length allowing the electric insulation being close to the slip ring 22.

The high voltage cable 15 is attached with its first end 15a to the down-conductor 14 and then driven through the interior of the blade 12 and further through one or more openings or holes inside the blade hub 8. From there the high voltage cable 15 is driven through one or more openings or holes like the central opening 11 or the front opening 5 into the main shaft 5 where a second end of the high voltage cable 15 is connected to the slip ring 22.

As is clearly seen, the high voltage cable 15 extends through the wind turbine 1 in a simple way without several directional shifts or turns from the blade 12 to the main shaft 4.

A current from a strike of lightning is conducted from the outside of a blade 12 to the down-conductor 14 through the high voltage cable 15 via the sliding connection of the slip ring 22 to the main shaft 4. From there, the current passes on through the tower connector 3 and the tower 2 to the ground. Sensitive electrical components like the stator windings and the permanent magnets of the rotor 7 and critical parts like the main bearings 6 are protected. Further, pitch systems and control systems inside the blade hub 8 are not affected by the electrical current from the strike of lightning as the current stays inside the high voltage cable 15.

Standard electrical insulated high voltage cables for lightning protection can be used as the high voltage cable can be driven in a simple way without several directional shifts or turns between the blade and the attachment area on the inner shaft.

The high voltage cable 15 connects the down-conductor 14 in the blade 12 with the grounded main shaft 4 so that the current from a strike of lightning is kept off the metallic blade hub 8 and therefore off the generator and critical parts inside the blade hub 8.

A single high voltage cable 15 was described so far for the ease of understanding. One high voltage cable 15 is provided for each blade 12. Most designs employ three blades 12 which leads to three high voltage cables 15 used for the lightning protection system 13.

The rotating parts of the wind turbine 1 are the blade hub 8 with the blades 12, the rotor 7, the brush holder 19 and the electric insulation 20. Further moving parts are the down-conductor 14, the high voltage cable 15, the shielding hose 17 and the brackets 18 and 21. The fixed parts are the tower 2, the tower connector 3, the main shaft 4 and the slip ring 22.

The main bearing connects the rotating parts and the fixed parts mechanically while the slip ring 22 and the second end 15b of the high voltage cable 15 connects them electrically.

This embodiment shows the main shaft 4 arranged as an inner shaft. The rotor 7 constitutes an outer shaft. The inner shaft is stationary fixed to the structure part of the wind turbine 1 and carries the stator of the generator. The outer shaft rotates as the blades 12 rotate and carries the rotor windings of the generator. This generator comprises an outer rotor and an inner stator.

FIG. 2 shows a second embodiment where the generator comprises an outer stator and an inner rotor. The elements of the wind turbine 1 carry the same reference numbers as the elements shown in FIG. 1.

The wind turbine 1 has a structure part called tower 2 which is fixed to the ground and electrically grounded. At the top of the tower 2 a tower connector 3 is attached. To the other end of the tower connector 3 a metallic main shaft 4 of the wind turbine 1 is fixed. The main shaft 4 has an approximately horizontal orientation. The main shaft 4 is a hollow tube having an inner surface 4a. At a front side of the main shaft 4 a front opening 5 of the main shaft 4 is located on the side opposite to the tower connector 3.

At the front side of the main shaft 4 a main bearing 6 is arranged on the inner surface 4a. The main bearing 6 may be a ball bearing fitted along the inner circumference of the main shaft 4. The main bearing 6 connects the main shaft 4 and a rotor 7 rotatively. The rotor 7 is arranged inside the main shaft 4 and carries rotor windings or permanent magnets of the generator which are for the sake of simplicity not shown. The corresponding stator windings (not shown) of the generator are arranged at the inner surface 4a of the main shaft 4.

To the front side of the rotor 7 a blade hub 8 is connected by means of bolts or screws 9. The blade hub 8 has the shape of a dome and is hollow. A base 10 of the blade hub 8 faces the front side of the rotor 7 and carries the bolts 9. The base 10 has a central opening 11 which is in communication with the front opening 5 and the interior of the main shaft 4. Inside the blade hub 8 electrical components e.g. like a pitch control may be located. The blade hub 8 may directly contact the main bearing 6 instead of being in indirect connection via the rotor 7. The rotor 7 may be part of the blade hub 8 or attached to it at a point behind the main bearing 6.

Attached to the outside of the blade hub 8 are blades 12. Usually three blades 12 are distributed along the circumference of the blade hub 8. Blades 12 can be mounted in a fixed manner or rotatively.

A lightning protection system 13 is installed with the wind turbine 1. A down conductor 14 is arranged in each blade 12 to conduct a lightning current from the blade surface.

A high voltage conductor like for example a high voltage cable 15 is connected to the down conductor 14. The high voltage conductor 15 is capable of conducting the large energy of a lightning strike without a risk that the current jumps from the conductor to a component of the wind turbine 1. The high voltage cable 15 has one or more outside layers of electrical insulation and one or more inside layers of electrical conducting material including an electrical conducting core.

A first end 15a of the high voltage cable 15 is connected to the down conductor 14. This connection is done inside the blade 12. If electrical components inside the blade 12 need to be protected for example, at least part of the down conductor 14 may comprise a high voltage cable as well. It is also possible to use a short down conductor 14 and a corresponding longer high voltage cable 15. Further, the high voltage cable 15 may replace the down conductor 14. In this case care has to taken that the current from the lightning strike is caught and guided to the high voltage cable 15.

The high voltage cable 15 progresses into the blade hub 8 inside the blade 12 through an opening 16 in the blade hub 8. The high voltage cable 15 and the down conductor 14 may run outside the blade 12. Then the high voltage cable 15 enters the blade hub 8 through an opening external to the blade 12.

Inside the blade hub 8 the high voltage cable 15 is surrounded by a preferably metallic shielding hose 17. The shielding hose 17 may be implemented directly in the high voltage cable 15. One end of the shielding hose 17 is connected to the blade hub 8 by a hub bracket 18. The shielding hose 17 may also cover the high voltage cable 15 or parts of it inside the blade 12.

The rotor 7 takes also the function of a brush holder 19. The brush holder 19 projects into the main shaft 4. The rotor 7 and with it the brush holder 19 has a length allowing the rotor windings and the stator to be placed on the rotor 7 and the main shaft 4, respectively. To the end being further inside the main shaft 4 i.e. closer to the tower connector 3 an electric insulation 20 is connected. The electric insulation 20 has the shape of a ring.

A main shaft bracket 21 for the high voltage cable 15 is fixed to the electric insulation 20. The main shaft bracket carries a second end of the shielding hose 17 which surrounds the high voltage cable 15. The shielding hose 17 may be fixed to the brush holder 19.

A slip ring 22 is attached to the inner surface 4a of the main shaft 4. A second end 15b of the high voltage cable 15 is in sliding communication with the slip ring 22. The slip ring 22 is located close to the electric insulation 20.

The high voltage cable 15 is attached with its first end 15a to the down-conductor 14 and then driven through the interior of the blade 12 and further through one or more openings or holes inside the blade hub 8. From there high voltage cable 15 is driven through one or more openings or holes like the central opening 11 or the front openings 5 into the main shaft 5 following a path away from the front end of the blade hub, where a second end of the high voltage cable 15 is connected to the slip ring 22.

As is clearly seen, the high voltage cable 15 extends through the wind turbine 1 in a simple way without several directional shifts or turns from the blade 12 to the main shaft 4.

A current from a strike of lightning is conducted from the outside of a blade 12 to the down-conductor 14 through the high voltage cable 15 via the sliding connection of the slip ring 22 to the main shaft 4. From there, the current passes on through the tower connector 3 and the tower 2 to the ground. Sensitive electrical components like the stator windings and the permanent magnets of the rotor 7 and critical parts like the main bearings 6 are protected. Further, pitch systems and control systems inside the blade hub 8 are not affected by the electrical current from the strike of lightning as the current stays inside the high voltage cable 15.

The high voltage cable 15 connects the down-conductor 14 in the blade 12 with the grounded main shaft 4 so that the current from a strike of lightning is kept off the metallic blade hub 8 and therefore off the generator and critical parts inside the blade hub 8.

This embodiment shows the main shaft 4 arranged as an outer shaft. The rotor 7 constitutes an inner shaft. The outer shaft is stationary fixed to the structure part of the wind turbine 1 and carries the stator of the generator. The inner shaft rotates as the blades 12 rotate and carries the rotor windings of the generator. This generator comprises an outer stator and an inner rotor.

The more detailed description of FIG. 1 applies also to FIG. 2 with the exception of details concerning the arrangement of the inner and outer shaft and the brush holder 19. The difference between the lightning protection systems 19 of FIGS. 1 and 2 is mainly the greater length of the high voltage cable 15 of FIG. 2.

The invention that has been described with reference to the embodiments offers the following advantages:

It is easy to implement in actual wind turbine designs.

Standard components can be used.

A lightning current can be kept off the generator.

The generator setup can be independent from the design of the lightning protection system.

The pitch system inside the hub will not be affected by a lightning current.

The control system inside the hub will not be affected by a lightning current.

There is no lightning current load on the main bearing.

The invention claimed is:

1. A lightning protection system for a wind turbine, the wind turbine having an electrically grounded structure part, a main shaft electrically and mechanically connected therewith, a blade hub rotationally connected via a main bearing to the main shaft and a plurality of blades connected to the blade hub, the lightning protection system comprising:
   a down-conductor able to be attached inside one of the blades;
   a high voltage conductor for guiding lightning current, wherein a first end of the high voltage conductor is in electrical communication with the down-conductor;
   a high voltage contact attached inside the main shaft behind the main bearing at a side opposite to the blade hub, wherein a second end of the high voltage conductor is in electrical communication with the high voltage contact;
   wherein the high voltage conductor follows a path away from the front end of the blade hub; and
   wherein a lightning current is guided from the down-conductor via the high voltage conductor to the high voltage contact.

2. The lightning protection system according to claim 1, wherein the high voltage conductor is disposed inside the blade hub.

3. The lightning protection system according to claim 1, wherein the high voltage conductor contacts the down-conductor positioned inside the blade.

4. The lightning protection system according to claim 1, wherein the high voltage conductor comprises at least part of the down-conductor.

5. The lightning protection system according to claim 1, wherein the high voltage conductor comprises a high voltage cable.

6. The lightning protection system according to claim 1, wherein at least part of the high voltage conductor is surrounded by a shielding hose.

7. The lightning protection system according to claim 1, wherein the high voltage contact comprises a slip ring attached to an inner surface of the main shaft.

8. The lightning protection system according to claim 1, wherein the high voltage contact comprises a carbon/metal brush.

9. The lightning protection system according to claim 1, wherein holding brackets for the high voltage conductor are able to be attached inside the blade hub and/or the main shaft.

10. A wind turbine, comprising:
   an electrically grounded structure part;
   a main shaft electrically and mechanically connected therewith;
   a blade hub rotationally connected via a main bearing to the main shaft;
   a plurality of blades connected to the blade hub; and
   a lightning protection system, comprising
      a down-conductor able to be attached inside one of the blades;
      a high voltage conductor for guiding lightning current, wherein a first end of the high voltage conductor is in electrical communication with the down-conductor;
      a high voltage contact attached inside the main shaft behind a main bearing at a side opposite to the blade hub, wherein a second end of the high voltage conductor is in electrical communication with the high voltage contact; and
      wherein a lightning current is guided from the down-conductor via the high voltage conductor to the high voltage contact.

11. The wind turbine according to claim 10, wherein the main shaft is an inner shaft carrying a stator of a generator and wherein an outer shaft carrying a rotor of the generator is connected with the blade hub.

12. The wind turbine according to claim 10, wherein the main shaft is an outer shaft carrying a stator of a generator and wherein an inner shaft carrying a rotor of the generator is connected with the blade hub.

13. The wind turbine according to claim 10, wherein a generator is connected directly to the blade hub.

* * * * *